United States Patent
Herbst et al.

(10) Patent No.: US 6,890,017 B2
(45) Date of Patent: May 10, 2005

(54) VISORS FOR AUTOMOTIVE VEHICLES AND METHODS OF FORMING THE SAME

(75) Inventors: Steven Bradley Herbst, Macomb, MI (US); Jon Theodore Riley, Clarkston, MI (US); Alan Dean Picken, Milford, MI (US); Karl Sommer, Rochester, MI (US)

(73) Assignee: Llink Technologies, Inc., Romeo, MI (US)

( * ) Notice: Subject to any disclaimer, the term of this patent is extended or adjusted under 35 U.S.C. 154(b) by 0 days.

(21) Appl. No.: 10/156,542

(22) Filed: May 28, 2002

(65) Prior Publication Data

US 2002/0185884 A1 Dec. 12, 2002

Related U.S. Application Data

(60) Provisional application No. 60/294,699, filed on May 31, 2001.

(51) Int. Cl.[7] .................................................. B60J 3/00
(52) U.S. Cl. ................... 296/97.1; 296/97.5; 296/97.6; 296/97.8; 296/97.11
(58) Field of Search .................... 296/97.1, 97.5, 296/97.6, 97.8, 97.9, 97.13, 97.12, 97.11

(56) References Cited

U.S. PATENT DOCUMENTS

| | | | | |
|---|---|---|---|---|
| 4,763,946 A | * | 8/1988 | Robbins et al. | 296/97.1 |
| 5,131,711 A | * | 7/1992 | Laferle | 296/97.1 |
| 5,374,097 A | * | 12/1994 | George et al. | 296/97.5 |
| 5,402,924 A | * | 4/1995 | Gilson | 296/97.6 |
| 5,417,466 A | * | 5/1995 | Giantonio et al. | 296/97.9 |
| 5,653,490 A | * | 8/1997 | Fink et al. | 296/97.11 |
| 5,823,603 A | * | 10/1998 | Crotty | 296/97.1 |
| 5,887,933 A | * | 3/1999 | Peterson | 296/97.1 |
| 6,174,019 B1 | * | 1/2001 | Collet et al. | 296/97.11 |
| 6,527,328 B2 | * | 3/2003 | Crotty, III et al. | 296/97.1 |
| 6,543,832 B1 | * | 4/2003 | Bogdanski et al. | 296/97.1 |

* cited by examiner

Primary Examiner—Jason Morrow
(74) Attorney, Agent, or Firm—Dobrusin & Thennisch PC

(57) ABSTRACT

A family of visors for automotive vehicles includes a plurality of members. Each member of the family includes at least some degree of commonality and preferably some degree of difference with one or more members of the family.

23 Claims, 13 Drawing Sheets

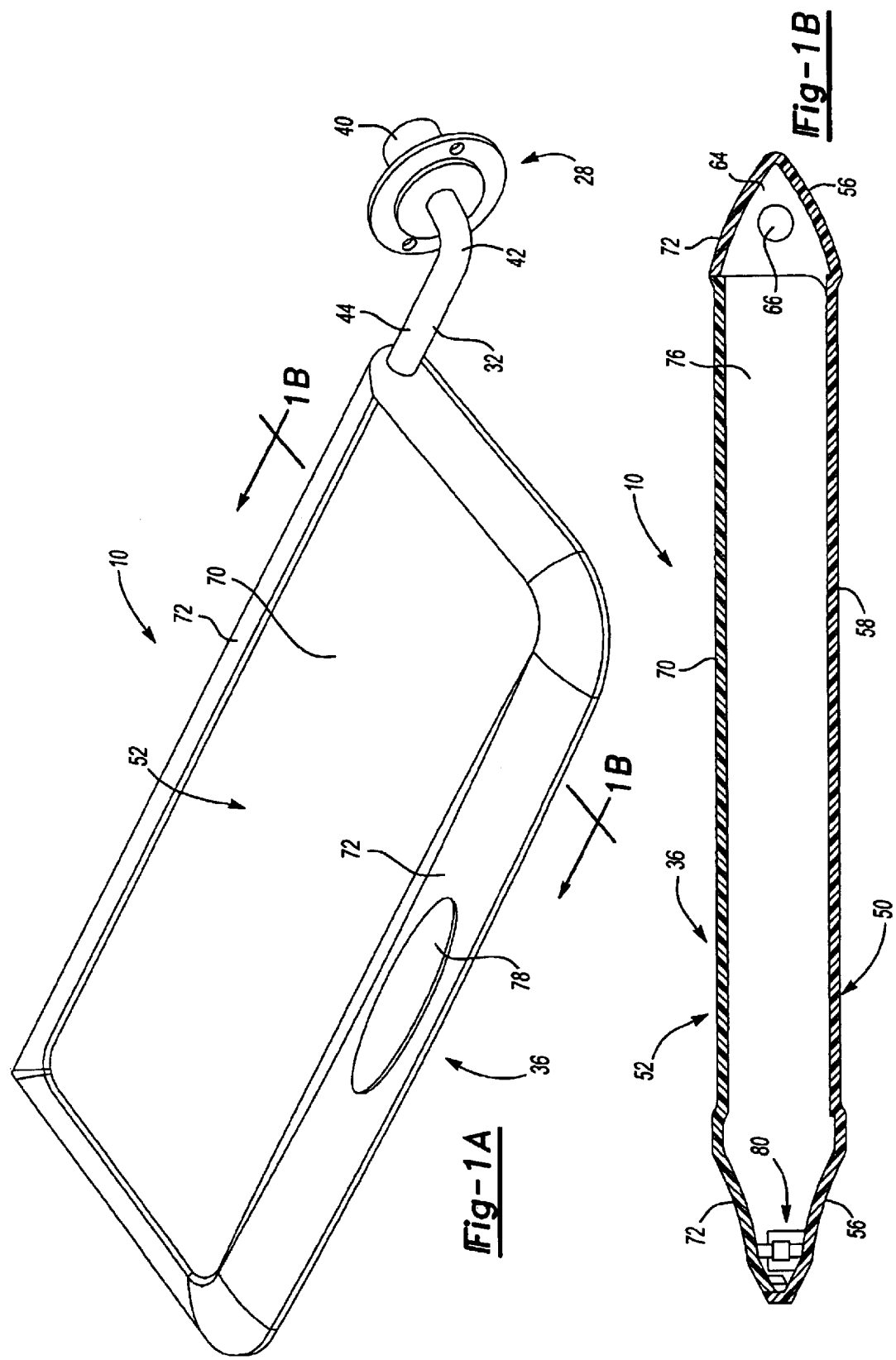

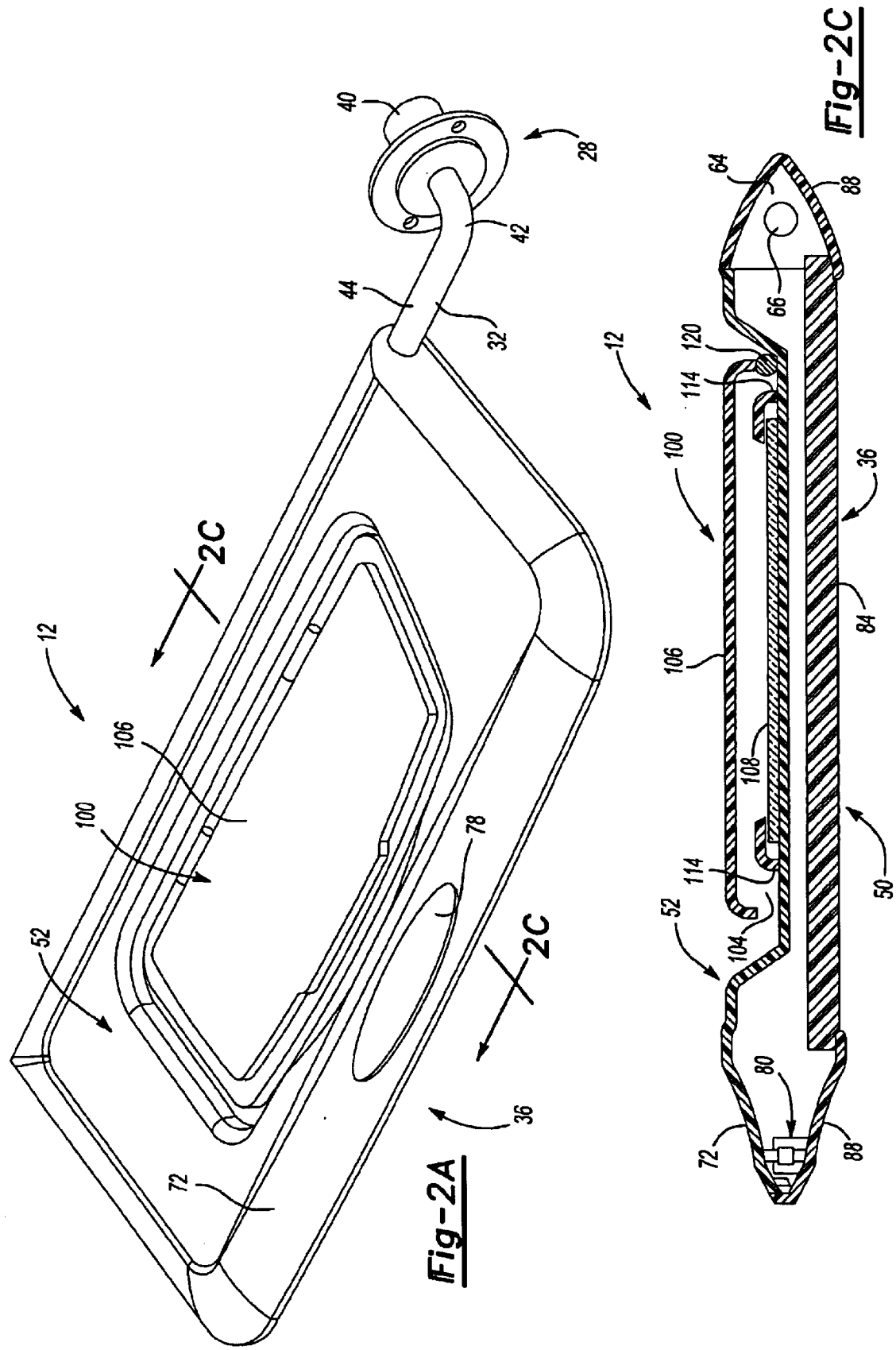

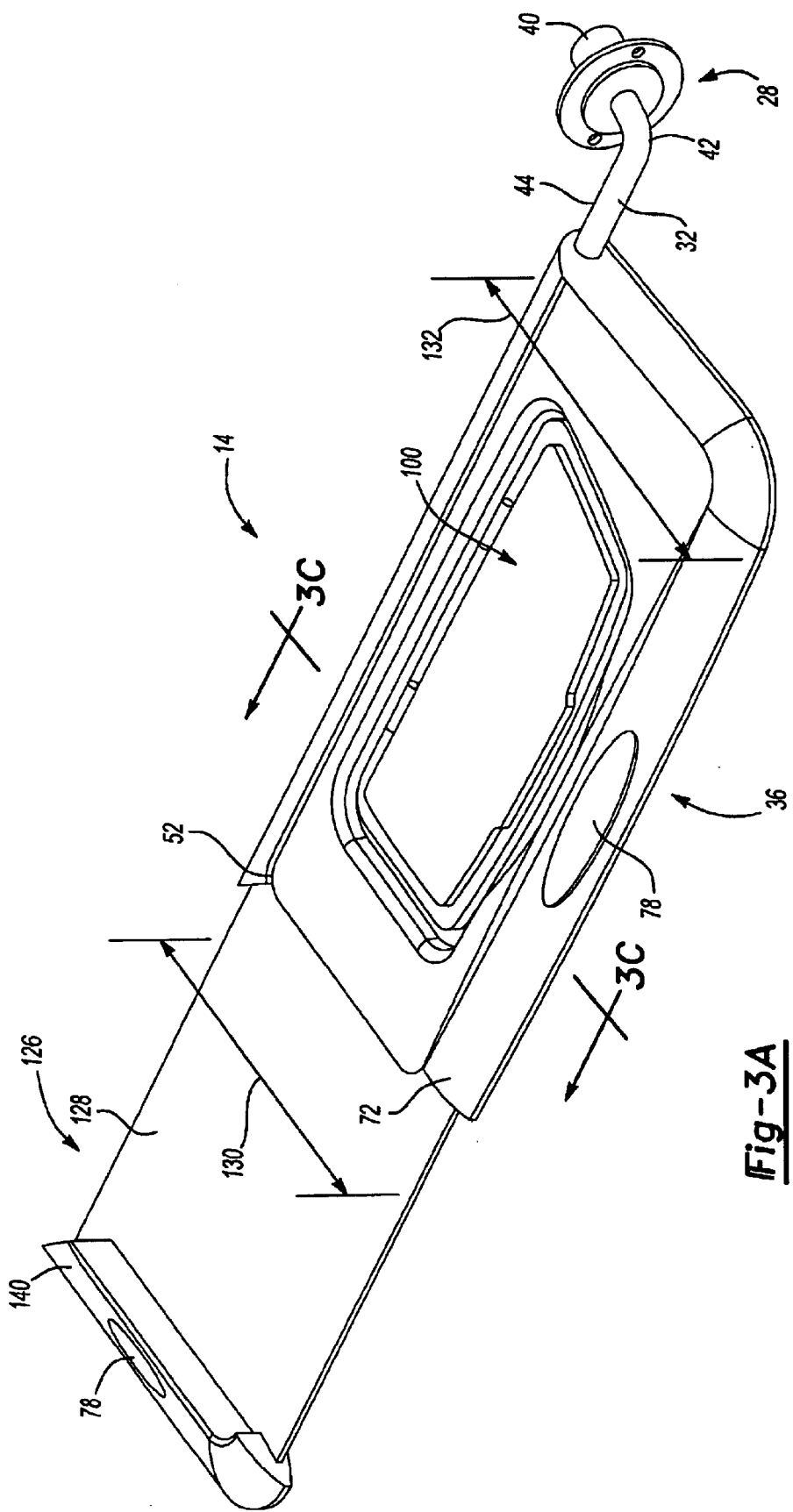

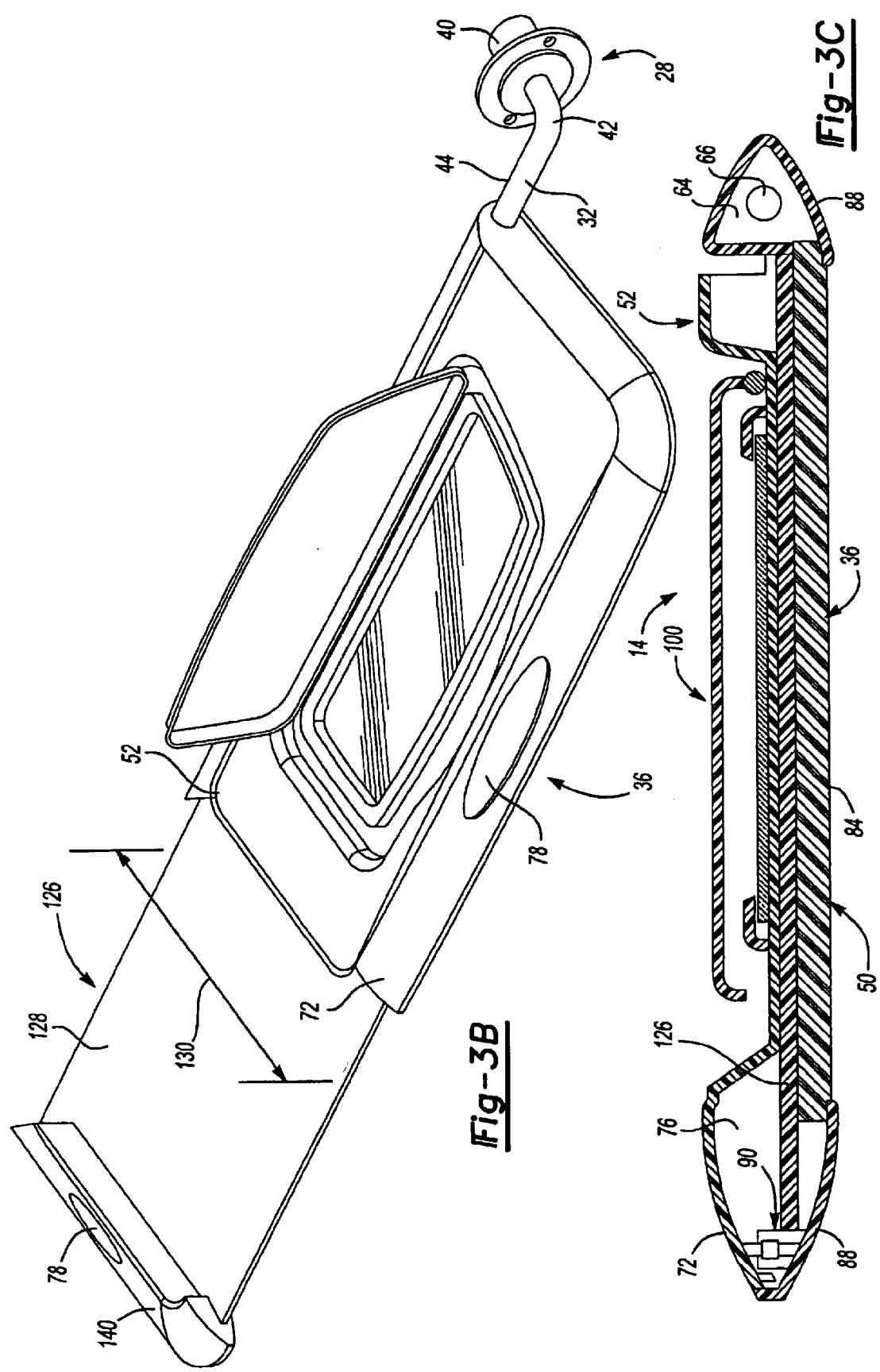

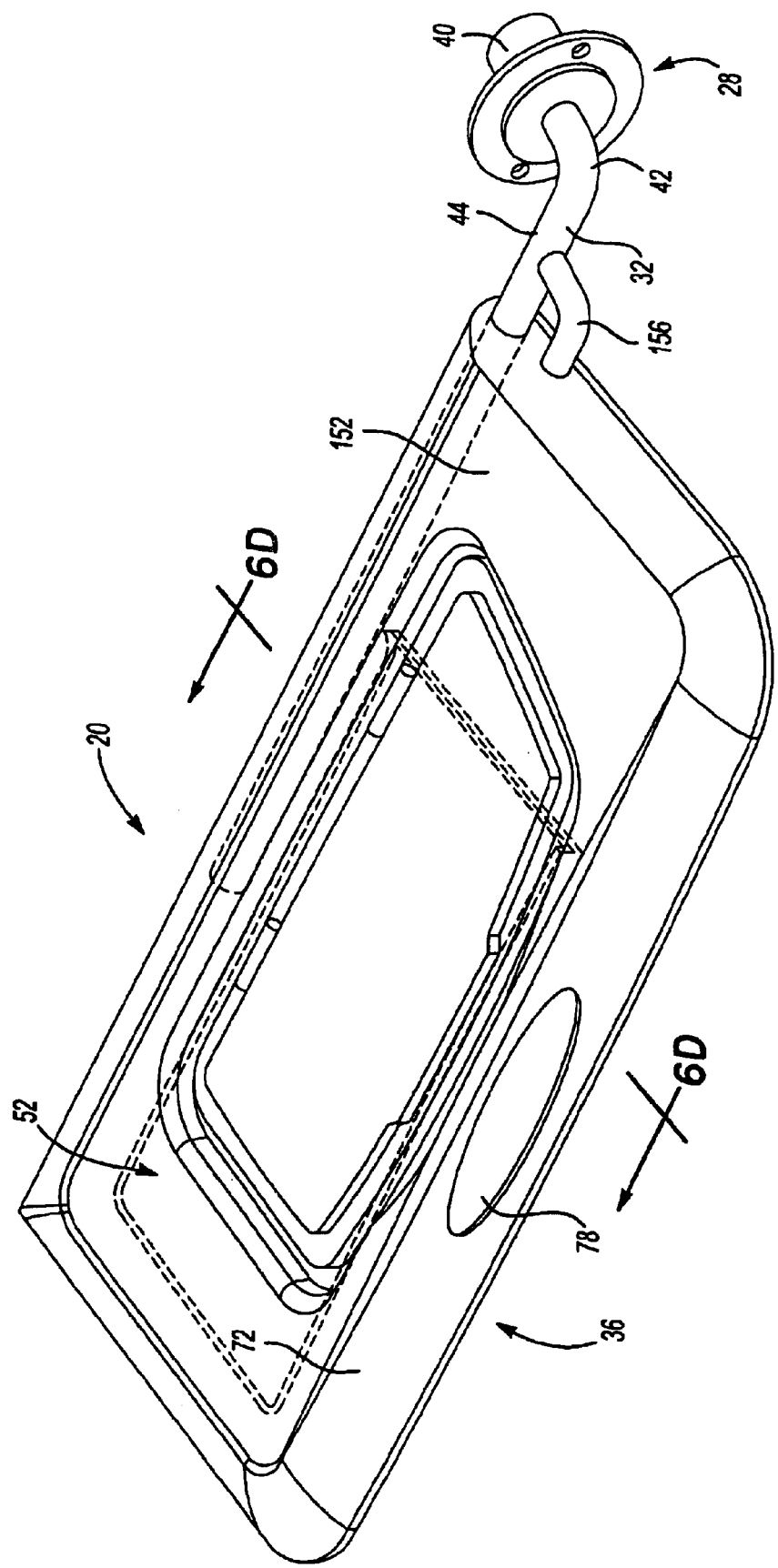

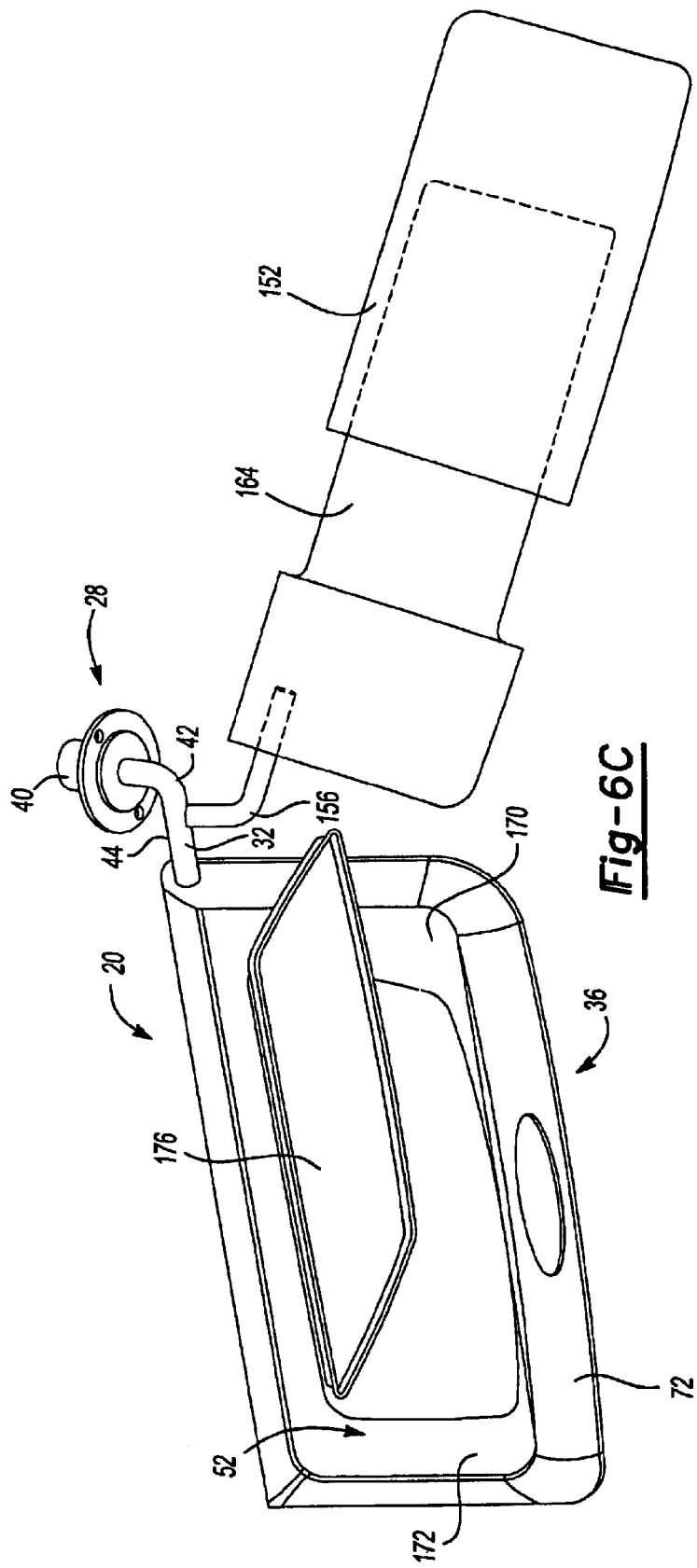
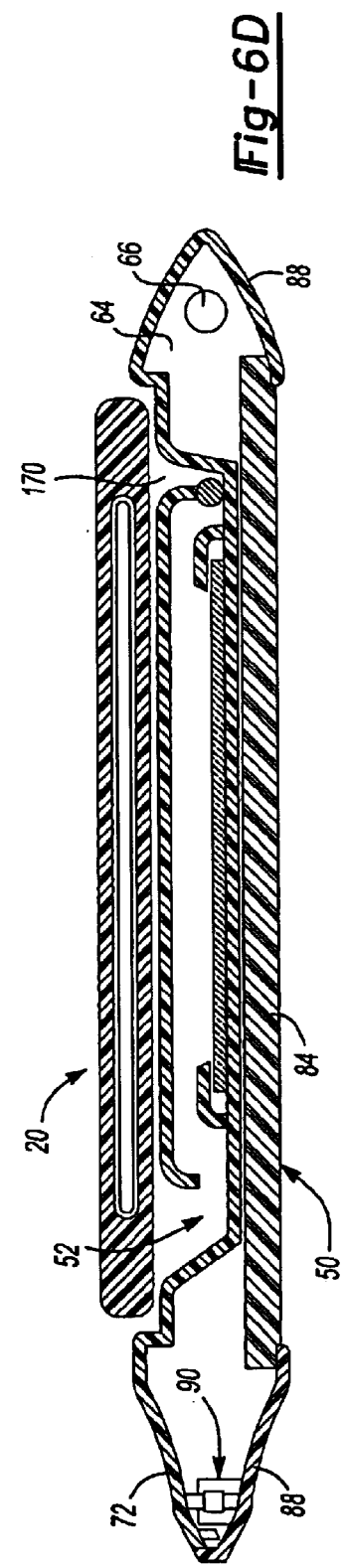

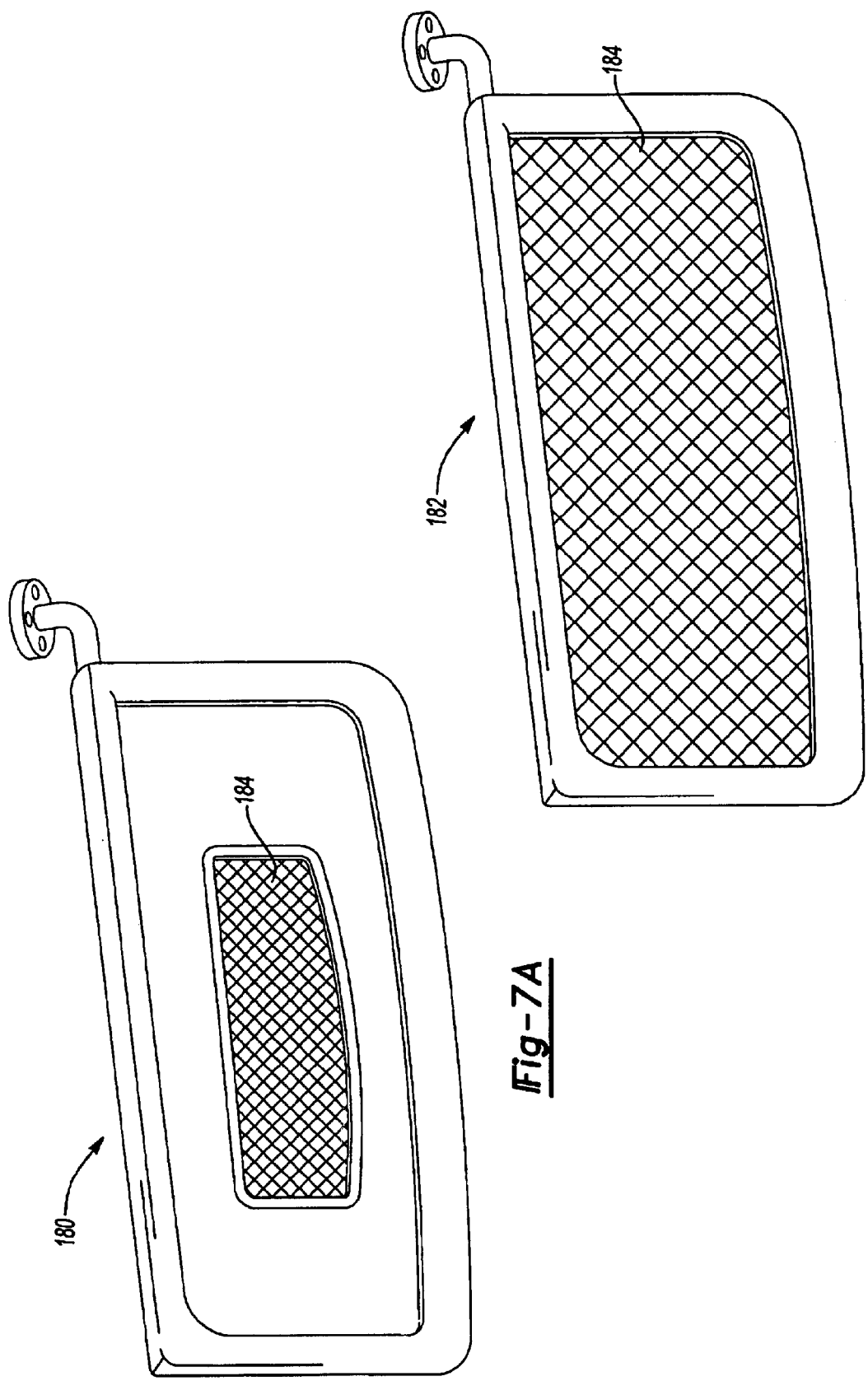

VISORS FOR AUTOMOTIVE VEHICLES AND METHODS OF FORMING THE SAME

CLAIM OF BENEFIT OF FILING DATE

The present application claims the benefit of the filing date of U.S. Provisional Application Ser. No. 60/294,699 (filed May 31, 2001), hereby incorporated by reference.

TECHNICAL FIELD

The present invention relates to visors for automotive vehicles. More particularly, the present invention relates to families of visors for one or more different automotive vehicles.

BACKGROUND OF THE INVENTION

It is known to employ visors in automotive vehicles for blocking undesirable direct or reflected light to shield the vision of drivers or passengers in the vehicles. It is generally desirable to provide a variety of different visors to satisfy variable conditions present within different automotive vehicles and to satisfy variable desires of automotive vehicle consumers. For example, automotive vehicles can include variable conditions such as size, shape, style, cost efficiency and the like. Thus, a variety of different visors may be desirable to complement such conditions. Additionally, automotive consumers may want a variety of visors with various visor features and styles. However, manufacturing of a variety of visors can be costly due to the variety of tools, materials, manufacturing techniques and the like that may need to be employed to form the visors. Thus, it would be desirable to provide visors with some degree of commonality to minimize manufacturing costs while still providing a variety of features for the visors.

SUMMARY OF THE INVENTION

According to one aspect, the present invention provides a family of visors including at least a first visor and a second visor. The first visor and the second visor both include a first side and a second side. The first sides are substantially identical to each other and preferably each of the first sides includes a generally rectangular perimeter portion, which may be formed of a polymer such as polypropylene. Each of the first sides also preferably includes a generally flat central portion, which may be an insert or otherwise. The first and second visors also preferably both include a second side. Each of the second sides of the visors also preferably includes a generally rectangular perimeter portion, which may be formed of a polymer such as polypropylene. The second side of the first visor preferably accommodates a first peripheral that is different from a second peripheral that is accommodated by the second side of the second visor. In a highly preferred embodiment, the first side of the first and second visors at least partially attaches to the second side of the first and second visors by snap fitting.

According to another aspect, the present invention provides a method of forming a visor family for automotive vehicles. According to the method, a first side of a first visor and a first side of a second visor are provided wherein the first sides of the visors are substantially identical to each other and at least a portion of the first sides of the visors is formed of a polymer. Preferably, the first sides of the visors each include a first perimeter portion that is formed of a polymer (e.g., an injection molded polymer) and a first insert that is attached to and substantially surrounded by the first perimeter portion. Each of the first and second visors is also provided with a second side wherein the second side of the first visor is configured to accommodate a first peripheral and the second side of the second visor is configured to accommodate a second peripheral different from the first peripheral. Preferably, the second sides of the first and second visor are respectively attached to the first sides of the first and second visor.

BRIEF DESCRIPTION OF THE DRAWINGS

These and other objects, features, aspects, and advantages of the invention will become apparent upon consideration of the specification and appended drawings in which:

FIG. 1(a) illustrates a perspective view of a base visor in a family of visors;

FIG. 1(b) is a sectional view of the base visor of FIG. 1(a) taken along line 1(b)–1(b); FIGS. 2(a)–2(b) illustrate perspective views of an advanced visor in the family of visors;

FIG. 2(c) is a sectional view of the advanced visor of FIGS. 2(a)–2(b) taken along line 2(c)–2(c);

FIGS. 3(a)–3(b) respectively illustrate perspective views of an advanced visor in the family of visors;

FIG. 3(c) is a sectional view of the advanced visor of FIGS. 3(a)–3(b) taken along line 3(c)–3(c);

FIGS. 6(a)–6(c) illustrate three perspective views of an advanced visor in the family of visors;

FIG. 6(d) is a sectional view of the base visor of FIG. 6(a)–6(c) taken along line 6(d)–6(d);

FIGS. 7(a)–7(b) illustrate perspective views of visors.

DESCRIPTION OF PREFERRED EMBODIMENT

Figure 2B:
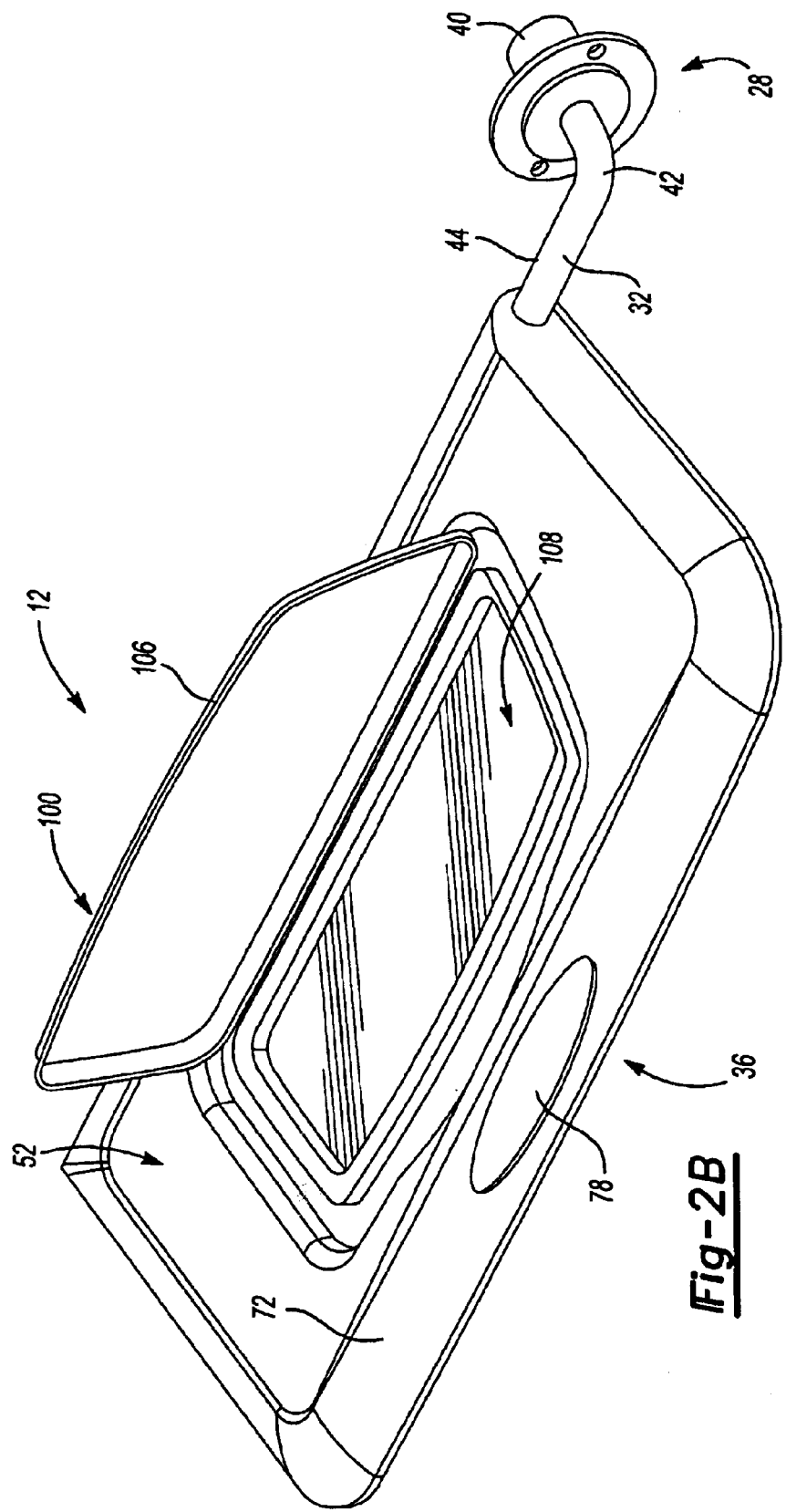

Generally, the present invention relates to the manufacture of a family of visors having at least some degree of commonality between the visors within the family to allow for efficient and economical manufacturing of the visors. Additionally, the family of visors may include differences between the visors within the family to satisfy conditions presented by various different vehicles and to satisfy consumer demand for certain types of visors, visor peripherals or both.

Referring now to FIGS. 1(a)–6(d), there is illustrated a family of visors 10, 12, 14, 16, 18, 20 for use in one or more automotive vehicles (not shown). Each visor 10–20 includes a fastening assembly 28 for attachment to a roof or ceiling portion (not shown) of the automotive vehicle. Each fastening assembly 28 is attached to a support member 32 that is adapted to support a body portion 36 of each visor 10–20. Preferably, the support member 32 includes a first elongated portion 40 extending away from the fastening assembly 28 and an arcuate portion 42 that connects a second elongated portion 44 of the member 32 to the first elongated portion 40 such that the second elongated portion 44 extends generally perpendicular to the first elongated portion 40. The support member 32 may be rotatably attached to the fastening assembly 28 for allowing the support member 32 and, thus, the body portion 36 of each visor 10–20 to rotate relative to the fastening assembly 28. The person of skill in the art will recognize that fastening assemblies and support members having a variety of configurations may be utilized in the present invention.

Each visor 10–20 of the family includes a first side wall portion 50 that can be attached to a second side wall portion 52. In one embodiment, the first side portion 50 opposes and is generally parallel to the second side portion 52. Preferably, the first portion 50 can be attached (e.g., snap fit, adhesively secured or the like) to the second side portion 52 to form the body 36 of each visor 10–20. In a most preferred embodiment, the first side portion 50 is the portion of each visor 10–20 that faces toward the interior of the vehicle when the visor 10–20 is in the stowed position, and the second side portion 52 faces toward the roof of the vehicle when in the stowed position.

Referring specifically to FIGS. 1(a)–1(b), the visor 10 illustrated is an embodiment of a base model of the family of visors 10–20 referred to herein as the base visor 10. The first side portion 50 of the base visor 10 is generally rectangular and includes a generally rectangular outer perimeter 56 substantially surrounding a generally flat central wall portion 58. The outer perimeter 56 is generally arcuate in cross-section as it surrounds the central portion 58. The first side portion 50 can form at least part of an elongated top edge portion 64 that is generally triangular in cross-section with a hole 66 extending along a length of the edge portion 64 for receiving the second elongated portion 44 of the support member 32.

The second side portion 52 of the base visor 10 includes a generally flat portion 70 and a generally rectangular outer perimeter portion 72 that may also be substantially arcuate in cross-section. The second portion 52 may form part of the elongated top edge portion 64 or the second portion 52 may fit flush to the elongated top edge portion 64. The second side portion 52 is preferably designed to fit flush to the first side portion 50 such that the two portions 50, 52 may be secured together to form the body 36 of the visor 10 with a generally continuous outer surface and an at least partially hollow interior 76.

The first side portion 50 may be secured to the second side portion 52 according to a variety of methods such as adhesive fastening and the like. In the preferred embodiment, the first side portion 50 and second side portion 52 are snap fit together with male and female portions of fasteners 80 (e.g., snaps) that may be distributed as needed or desired upon the first and second side portions 50, 52. Preferably, the snaps 80 or other fastening mechanisms or mediums are dispersed about the perimeters 72, 56 of the side portions 50, 52. It shall be recognized, however, that fastening mechanisms may be provided in a variety of places upon the first and second side portions 50, 52 depending on the configurations of the portions 50, 52.

The first side portion 50 and the second side portion 52 of the base visor 10 can be made from a variety of materials. In one embodiment, the first and second side portions 50, 52 are formed of a polymeric material that is preferably molded. In a preferred embodiment, the first and second side portions 50, 52 are formed of polypropylene and are injection molded in an appropriate mold. In a highly preferred embodiment, at least one or both of the first and second side portions 50, 52 and, preferably, the outer perimeter portions 56, 72 include gripping regions 78. The gripping regions 78, as shown, are generally elliptical but may be formed in nearly any shape or configuration as desired. Preferably, the gripping regions 78 are formed of different and softer material or polymer than the rest of the side portions 50, 52. One exemplary material for the gripping regions 78 is a thermoplastic vulcanite such as SANTOPRENE, commercially available from Advanced Elastomer Systems, 388 S. Main Street, Akron, Ohio, 44311-1059. However, a variety of the materials may also be utilized. It is preferable for the gripping regions 78 to be located where an individual will likely grab, grasp or grip the visor.

It shall be recognized that the first side portion 50 and that second side portion 52 may be formed according to a variety of configurations to ultimately form the body 36 of the visor 10.

Referring to FIGS. 1(a)–6(d), the family of visors 10–20 also includes higher level visors 12–20 that are formed based upon the base visor 10, but which include features not included in the base visor 10. Such visors 12–20 are referred to herein as advanced visors 12–20.

Referring to FIGS. 1 (a)–6(d), the first side portion 50 of each of the advanced visors 12–20, preferably, includes at least some level of commonality with the first side portion 50 of the base visor 10. In a preferred embodiment, each first side portion 50 of each visor 10–20 of the family can be formed using one mold that can receive and shape polymeric materials. In one embodiment, each of the first side portions 50 of the family of visors 10–20 may be substantially identical. In another embodiment and as can be seen with reference to FIGS. 2(c), 3(c), 5(d) and 6(d), the first side portion 50 of one or more of the visors 12–20 can also be adapted to include a centralized generally rectangular insert 84 that substantially provides the flat portion 58 of the first side portion 50. The insert 84 may be substantially surrounded by a perimeter portion 88 substantially identical to the perimeter portion 56 of the first side portion 50 of the base visor 10. Preferably, the insert 84 includes a solid base (not shown) that is substantially surrounded by a cloth material.

As used herein, inserts 84 that are substantially identical to each other are typically identical in shape, size and configuration such that the inserts may be attached in like manners to substantially identical perimeter portions. It is contemplated, however, that various inserts 84 may be substantially identical while still including different aesthetic features (e.g., aesthetic designs, colors, cloth designs or types etc.).

In one embodiment, the first side portions 50 of the advanced visors 12–20 may be formed by placing the insert 84 into the same mold as that used for the first side portion 50 of the base visor 10 followed by injection molding of polypropylene or other like material about the insert 84 to integrate the insert 84 within the perimeter portions 88 of the advanced visors 12–20. In another embodiment, the perimeter portions 56, 88 of the first side portions 50 may be formed and the central portion 58 and the insert 84 may both be treated as inserts to fit within the perimeter portions 56, 88. The inserts could be held within the perimeter portions by brackets, adhesives, heat staking interference fits or other fastening mechanisms. In another embodiment, each of the visors 10–20 of the family may include the insert 84 or each first side portion 50 of each visor 10–20 may be made of entirely moldable material (e.g., plastic).

Advantageously, the base visor 10 and advanced visors 12–20 can be formed to have substantially identical perimeter portions 56, 88 first side portions 50 or other portions with substantially identical snaps 80 or other fastening mechanisms thereby allowing each of the first side portions 50 to be interchangeably fastened to each of the second side portions 52 as will be further discussed below. Also advantageous, the family of visors 10–20 may provide two types of first side portions 50 (i.e., those with inserts and those without) that can be formed using substantially the same manufacturing tools and which, can be interchanged with a variety of second side portions 52 of the family of visors 10–20.

The second side portions 52 of the visors 10–20 may be varied to provide for and accommodate various features and peripherals that may be desirable for the visors 10–20. The second side portions 52 may also include a substantially common portion (e.g., its perimeter portion 72) that can be fastened to each of the first side portions 50 while the second portion 52 may also be adapted to accommodate or support various visor peripherals such as vanities and the like. Preferably, each of the second side portions 52 of the visors 10–20 are formed to fasten or otherwise attach to each of the first side portions 50 of the visors 10–20.

Either of the outer perimeter portions 56, 88 of either first side portion 50, 52 may form all or a portion of the outer periphery of the body 36 of each of the visors 10–20 and the outer perimeter portions 72 of the other side portion 50, 52 may be adapted to form the remainder of the outer periphery of the body.

The advanced visor 12 illustrated in FIGS. 2(a)–2(c) includes a vanity assembly 100 fitted upon the second side portion 52 of the visor 12. The second side portion 52 of the visor 12 is preferably molded plastic (e.g., polypropylene) and includes fasteners 80 to fit to the first side portion 50 in a manner substantially identical to the base visor 10. The second side portion 52 has been formed (e.g., injection molded) to define a generally rectangular cavity 104 for receiving a generally rectangular vanity cover 106 and a generally rectangular mirror 108. The mirror 108 is mounted in the cavity 104 with one or more brackets 114 that extend outward from the second side portion 52 to overlie the outer perimeter of the mirror 108.

The vanity cover 106 is hingedly attached with fasteners 120 to the second side portion 52 within the cavity 104. The cover 106 can rotate about the fasteners 120 to selectively open or expose the mirror 108.

The advanced visor 14 of FIGS. 3(a)–3(c) is formed to be substantially similar or identical to the advanced visor 12 of FIGS. 2(a)–2(c), and includes a substantially identical vanity assembly 100. The visor 14 is additionally fitted with a visor extension 126 for extending the light blocking coverage ability of the visor 14. The visor extension 126 preferably, includes a generally rectangular wall 128 having a width 130 that extends substantially across an entire width 132 of the visor 14. As shown, a portion of the outer perimeter 72 of the first and/or second side portions 50, 52 of the visor 14 forms a handle 140 of the visor extension 126 such that an individual could grab the handle 140 and slide the wall 128 of the visor extension 126 into and out of the interior hollow portion 76 which accommodates the visor 14. Preferably, the extension 126 includes one or more gripping regions 78.

According to one embodiment of the invention, one or more molds for forming at least part of the first and/or second side portions 50, 52 of the visor 14 may be fitted with inserts for forming the handle 140 of the visor extension 126. Notably, the molds receiving the inserts may be the same as those used to form at least portions of each of the visors 10–20 of the family. The wall 128 of the extension 126 may be formed integrally with the handle 140 or may be otherwise fastened to the handle 140.

Figure 4:
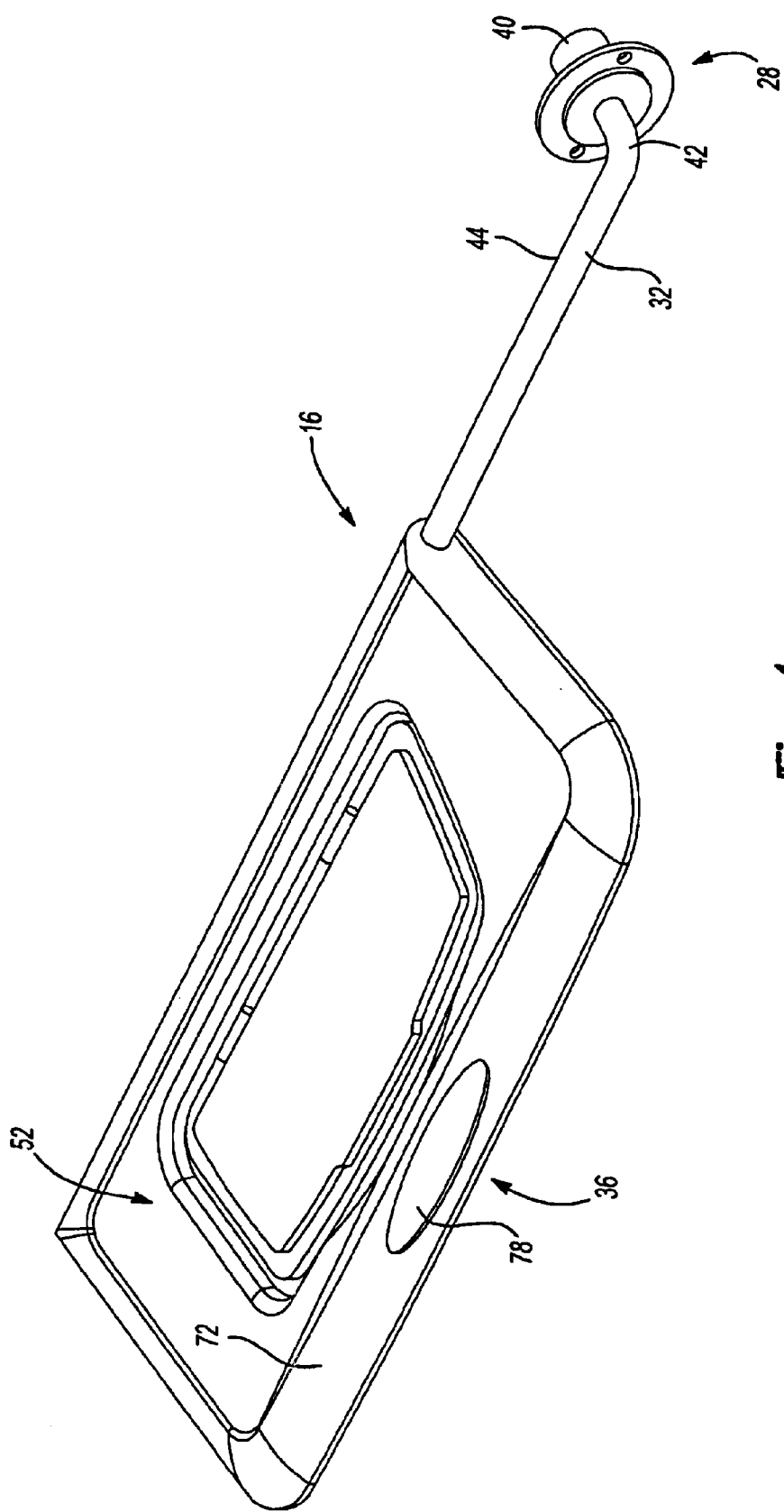
FIG. 4 illustrates a perspective view of a visor in the family of visors.
Figure 5A:
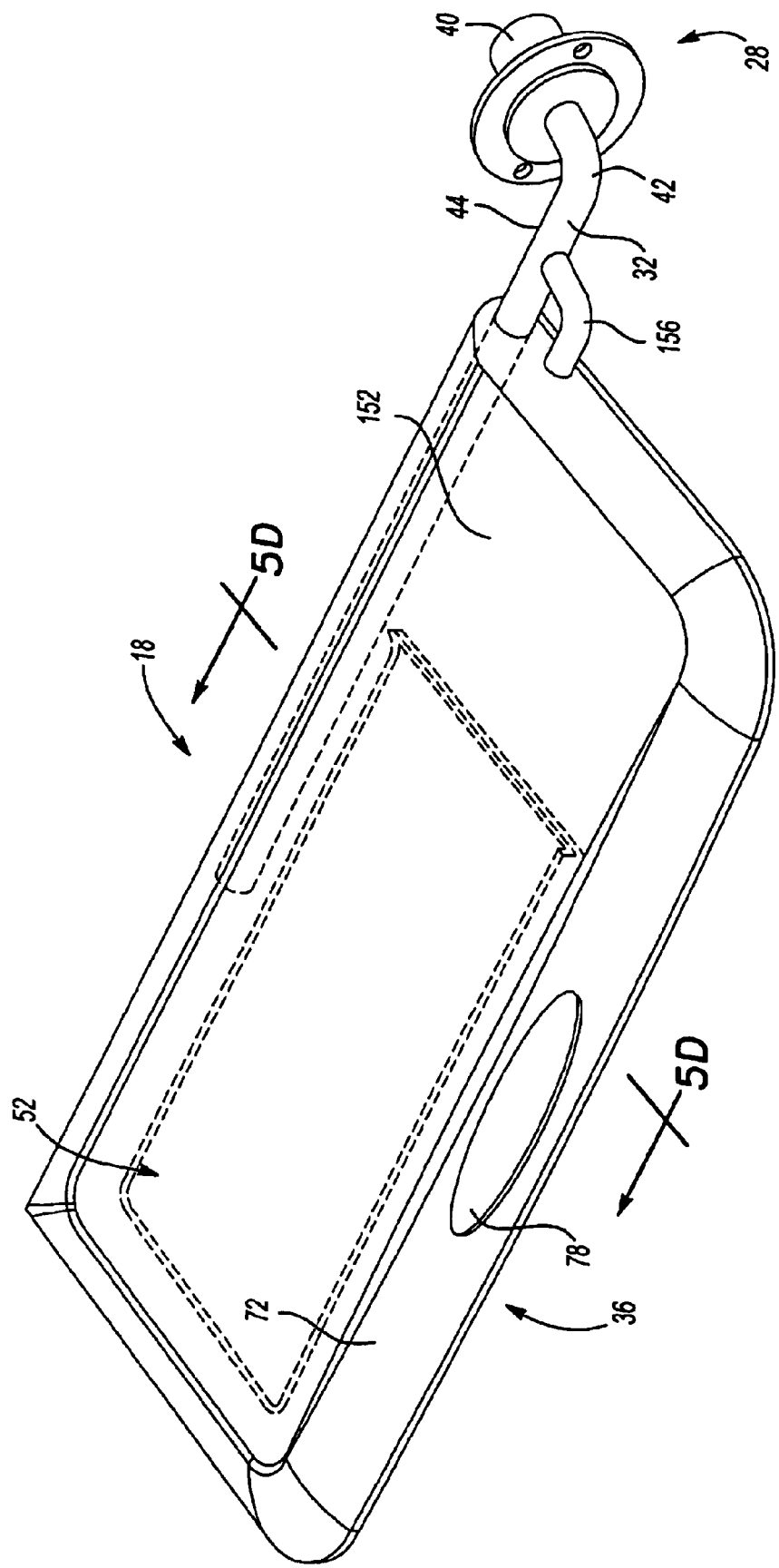
FIGS. 5(a)–5(c) illustrate three perspective views of an advanced visor in the family of visors.
Figure 5B:
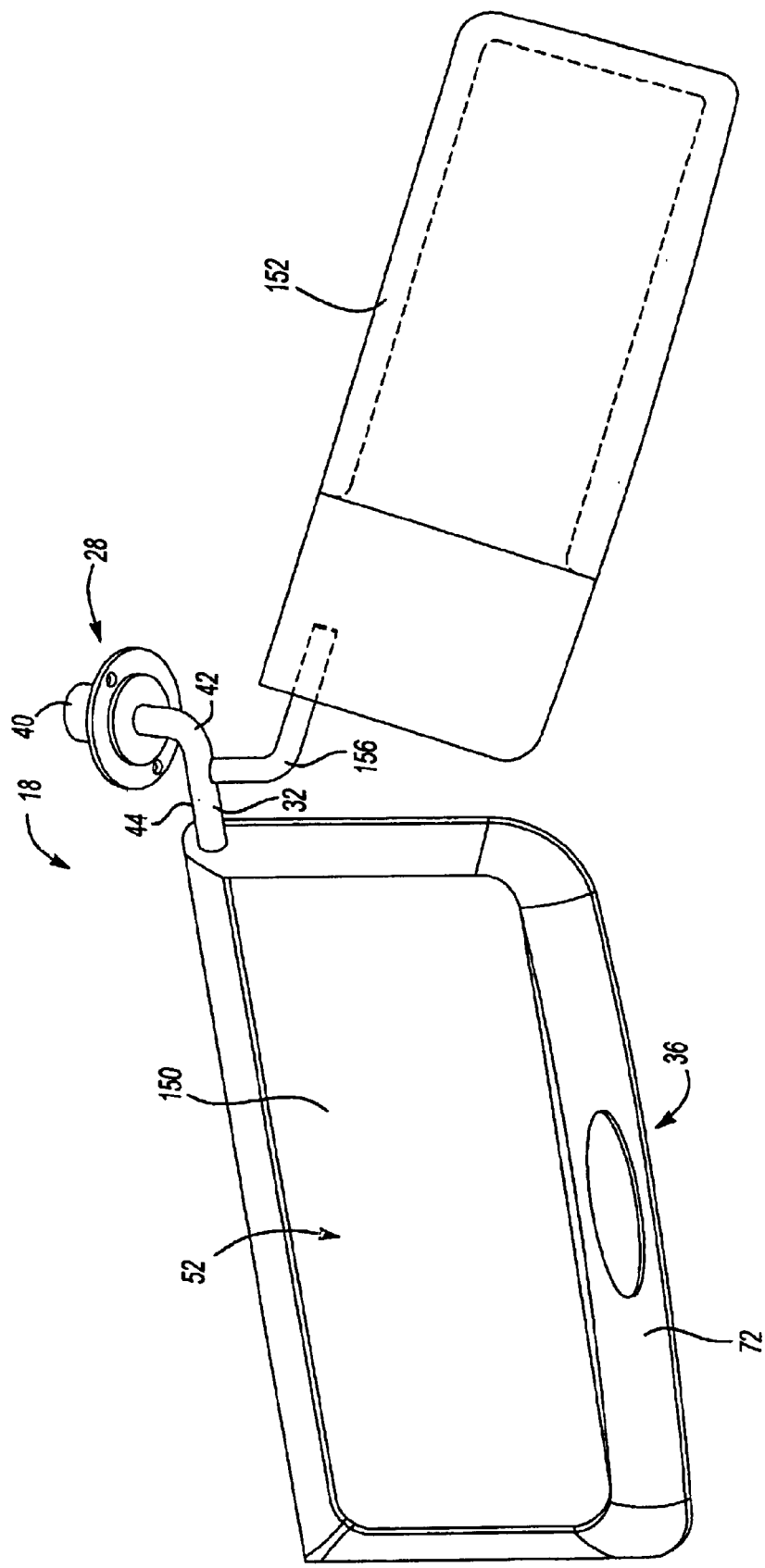
Figure 5C:
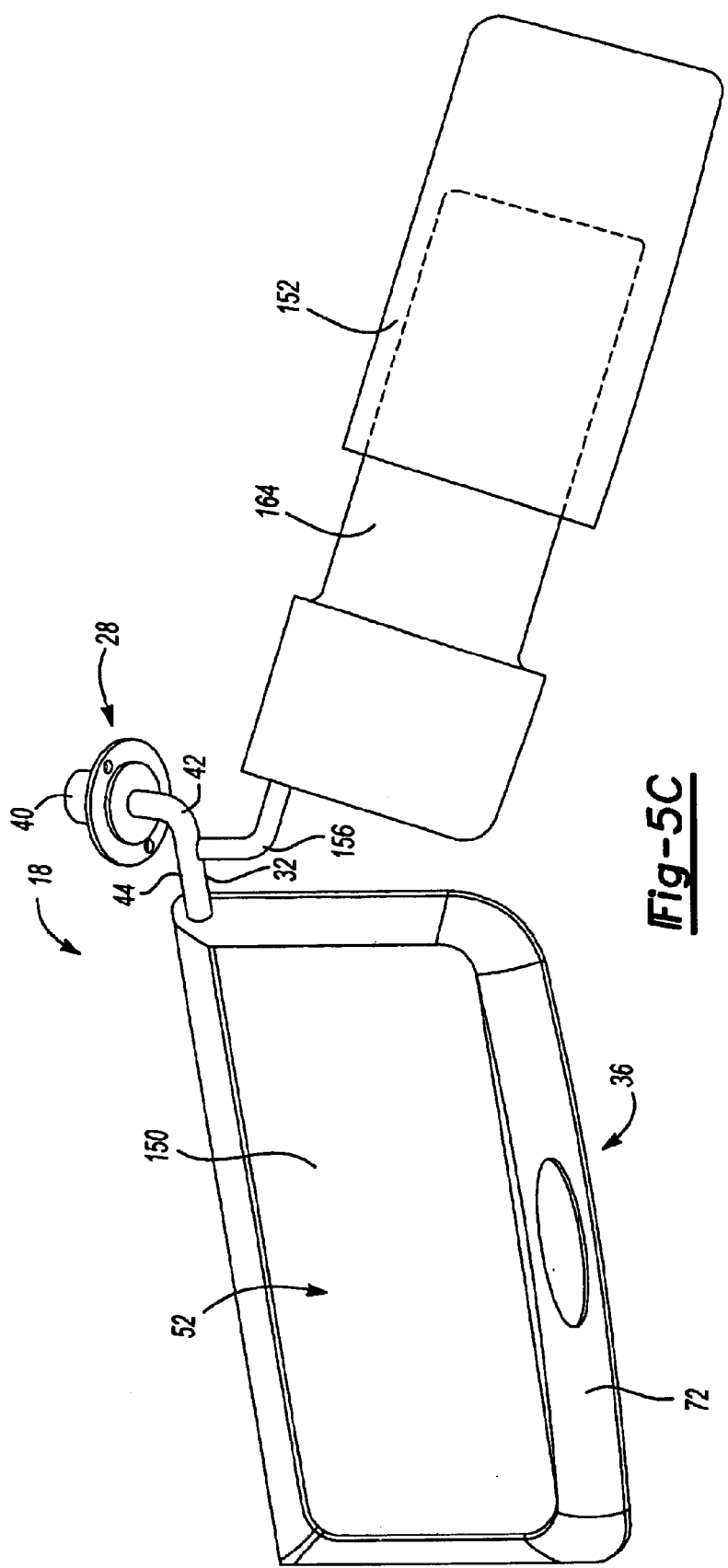
Figure 5D:
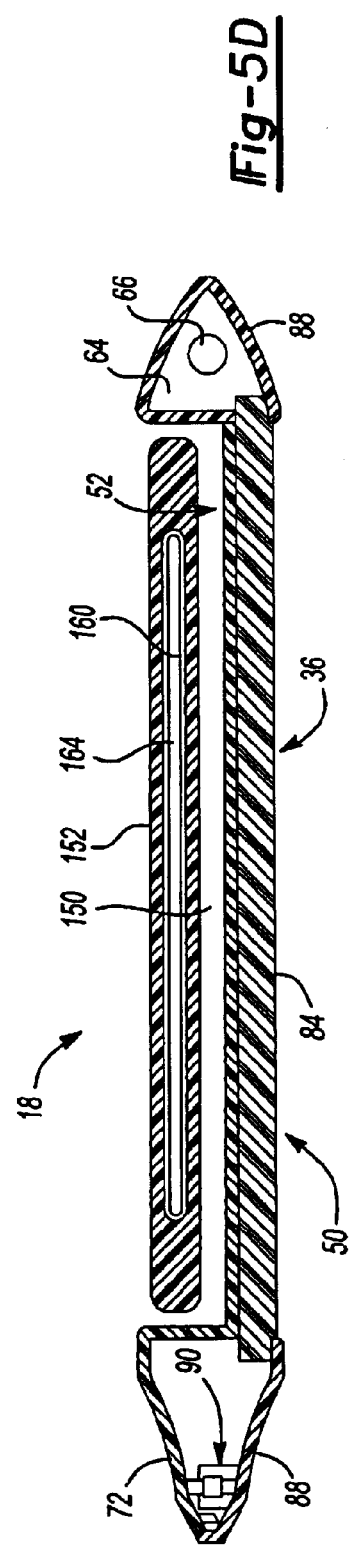
FIG. 5(d) is a sectional view of the advanced visor of FIGS. 5(a)–5(c) taken along line 5(d)–5(d)
Figure 6B:
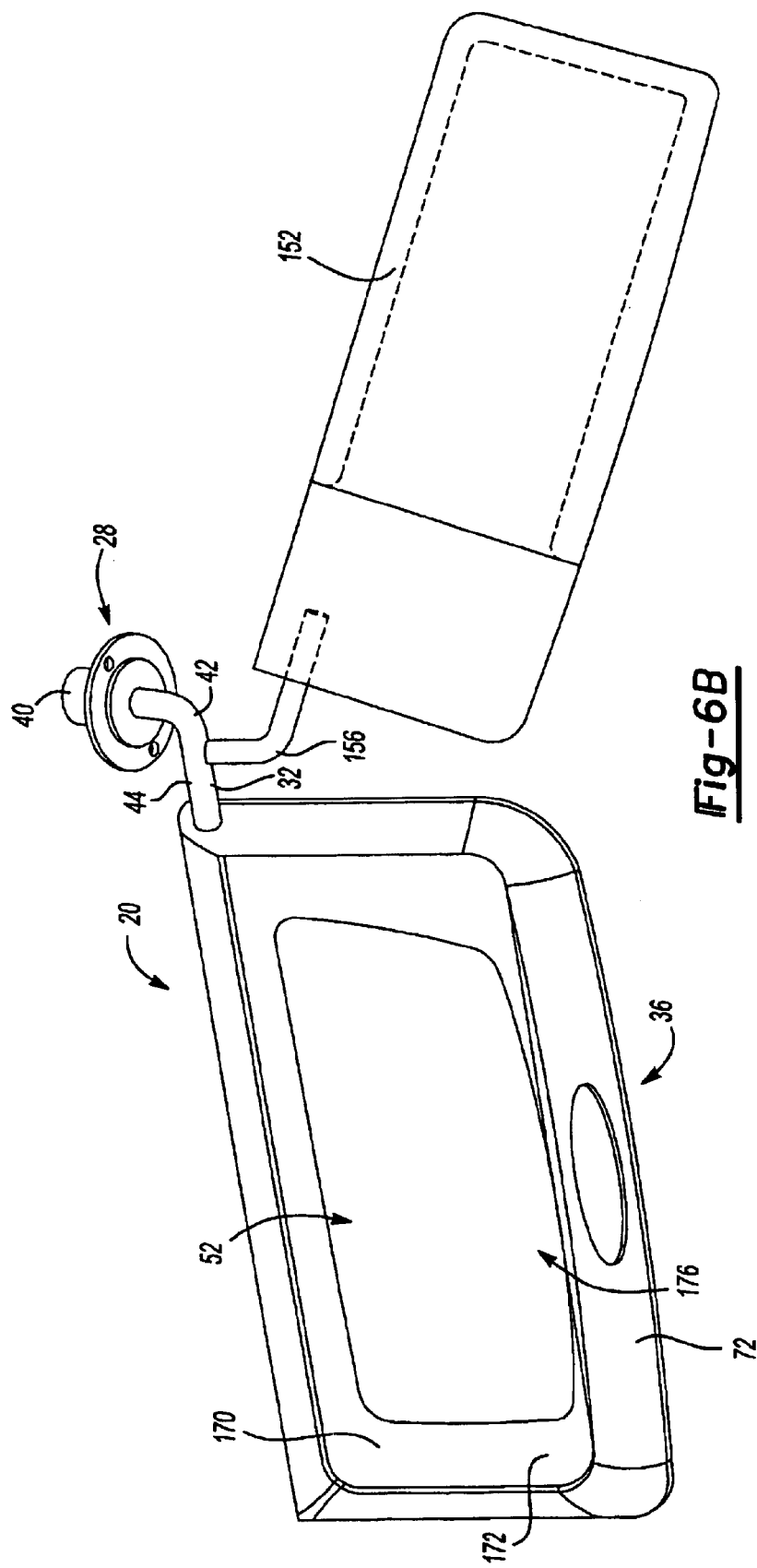

The advanced visor 16 of FIG. 4 is designed to allow the body 36 of the visor 16 to translate along the second portion 44 of the support member 32 for allowing the light blocking coverage ability of the visor 16 to be varied by a driver or passenger of an automotive vehicle. Preferably, the second portion 44 of the support member 42 is frictionally slide fit within the hole 66 of the visor 16 allowing translation of the body 36 of the visor 16 while still reliably securing the body 36 to the second portion 44.

The advanced visor 18 of FIGS. 5(a)–5(d) includes a first side portion 50 substantially identical to the first side portions 50 of the visors 12, 14, 16 of FIGS. 2(a)–4. The second side portion 52 of the visor 18 includes a cavity 150 that is generally rectangular and spans nearly the entire second side portion 52 with the exception of the outer perimeter 72.

Preferably, the second side portion 52 of the visor 18 is secured to the first side portion 50 of the visor 18 in a manner similar or identical to that used to secure together the other visors 10, 12, 14, 16. The cavity 150 is configured for receiving and accommodating a secondary visor wall 152. The secondary visor wall 152 spans substantially the entire cavity 150 and is rotatable relative to the body 36 of the visor 18 for providing additional light blocking protection.

The secondary visor wall 152 is attached to an arcuate member 156 that is rotatably attached to the second side portion 44 of the support member 32 to allow the secondary visor wall 152 to rotate relative to the body portion 36 of the visor 18. Preferably, the secondary visor wall 152 may be used to primarily block light entering an automotive vehicle through a door window (not shown) while the visor body 36 may be used to primarily block light entering an automotive vehicle through a windshield (not shown) of the vehicle. In a most preferred embodiment, the secondary visor wall 152 includes a hollow interior 160, in which, an extension 164 of the secondary visor wall 152 may be disposed. As shown best in FIG. 5(c), the extension 164 may be selectively exposed relative to the remainder of the secondary visor wall 152 to extend the coverage ability of the secondary visor wall 152.

The advanced visor 20 of FIGS. 6(a)–6(d) is substantially identical to the advanced visor 18 of FIGS. 5(a)–5(d) with the exception that its cavity 170 is at least partially defined by a back wall 172, which supports a vanity assembly 176 substantially identical to the vanity assemblies 100 of FIGS. 2(a)–4. Also, the secondary visor wall 152 may not fit as deeply into its cavity 170.

Visors 180, 182 are also illustrated in FIGS. 7(a)–7(b) to show that pockets 184 for containing or supporting various items may also be integrated into the family of visors 10–20. The pockets 184 illustrated are formed of mesh netting and may be sewn or otherwise attached to the visors 180, 182.

As shown herein, one family of visors 10–20 has been illustrated and discussed. However, is contemplated that two or more families may be developed based upon the family shown to provide light blocking coverage for the various automotive vehicle lines provided by automotive manufacturers. As an example, a family of relatively large visors may be formed for all the automotive vehicles having larger windshields such as luxury cars, sport utility vehicles and the like. At the same time, a family of relatively small visors might be formed to accommodate automotive vehicles having smaller windshields such as economy cars, compacts and the like.

It should be understood that the invention is not limited to the exact embodiment or construction, which has been illustrated and described but that various changes may be made without departing from the spirit and the scope of the invention.

What is claimed is:

1. A method of forming a visor family for automotive vehicles, comprising:

providing a first visor having a first side portion and a second side portion wherein;

i) the first visor includes a molded polymer perimeter portion surrounding an insert on the first side portion of the first visor, the insert being of different material than the perimeter portion; and ii) the second side portion of the first visor supports a first peripheral component;

providing a second visor of the visor family having a first side portion and a second side portion wherein;

i) the second visor includes a molded polymer perimeter portion surrounding an insert on the first side portion of the second visor;

ii) the first side portion of the second visor is substantially identical to the first side portion of the first visor; and iii) the second side portion of the second visor supports a second peripheral component different from the first peripheral component;

assembling the first visor to a first automotive vehicle of a first size and first style; and assembling the second visor to a second automotive vehicle of a second size and a second style different respectively from the first size and first style;

wherein the first peripheral component is selected from a vanity or a pocket and the second peripheral component is a secondary visor wall.

2. A method of forming a visor family as in claim 1 wherein the first peripheral component is at least part of an insert that is attached to the second side portion of the first visor.

3. A method of forming a visor family as in claim 1 wherein the first peripheral component includes a vanity.

4. A method of forming a visor family as in claim 1 wherein the first side portion is at least partially attached to the second side portion via a snap-fit.

5. A method of forming a visor family as in claim 1 wherein the molded polymer includes polypropylene.

6. A method of forming a visor family as in claim 1 wherein the perimeter portion includes a gripping region set into the perimeter portion, the gripping region including a relatively soft polymer different from the molded polymer for providing a soft feel.

7. A method of forming a visor family as in claim 1 wherein the secondary visor wall is rotatable relative to a body portion of the visor such that the secondary visor wall primarily blocks light entering the second automotive vehicle through a door window while the body portion of the visor primarily blocks light entering the second automotive vehicle through a windshield.

8. A method of forming a visor family for automotive vehicles, comprising:

providing a first visor having a first side portion and a second side portion wherein;

i) the first visor includes a molded polymer perimeter portion surrounding an insert on the first side portion of the first visor, the insert being of different material than the perimeter portion; and ii) the second side portion of the first visor supports a first peripheral component;

providing a second visor of the visor family having a first side portion and a second side portion wherein;

i) the second visor includes a molded polymer perimeter portion surrounding an insert on the first side portion of the second visor;

ii) the first side portion of the second visor is substantially identical to the first side portion of the first visor; and iii) the second side portion of the second visor supports a second peripheral component different from the first peripheral component;

assembling the first visor to a first automotive vehicle of a first size and first style; and assembling the second visor to a second automotive vehicle of a second size and a second style different respectively from the first size and first style;

wherein the first peripheral component is at least part of an insert that is attached to the second side portion of the first visor; and wherein the second peripheral component is a secondary visor wall.

9. A method of forming a visor family as in claim 8 wherein the first side portion is at least partially attached to the second side portion via a snap-fit.

10. A method of forming a visor family as in claim 8 wherein the injection molded polymer includes polypropylene.

11. A method of forming a visor family as in claim 8 wherein the perimeter portion of the first side portion includes a gripping region, the gripping region including a relatively soft polymer different from the injection molded polymer for providing a soft feel.

12. A method of forming a visor family for automotive vehicles, comprising:

providing a first visor having a first side portion and a second side portion wherein;

i) the first visor includes a molded polymer perimeter portion surrounding an insert on the first side portion of the first visor, the insert being of different material than the perimeter portion; and ii) the second side portion of the first visor supports a first peripheral component;

providing a second visor of the visor family having a first side portion and a second side portion wherein;

i) the second visor includes a molded polymer perimeter portion surrounding an insert on the first side portion of the second visor;

ii) the first side portion of the second visor is substantially identical to the first side portion of the first visor; and iii) the second side portion of the second visor supports a second peripheral component different from the first peripheral component;

assembling the first visor to a first automotive vehicle of a first size and first style; and assembling the second visor to a second automotive vehicle of a second size and a second style different respectively from the first size and first style;

wherein the insert includes a solid base covered by a cloth material.

13. A method of forming a visor family as in claim 12 wherein the first side portion is at least partially attached to the second side portion via a snap-fit.

14. A method of forming a visor family as in claim 12 wherein the injection molded polymer includes polypropylene.

15. A method of forming a visor family as in claim 12 wherein the perimeter portion of the first side portion includes a gripping region, the gripping region including a relatively soft polymer different from the injection molded polymer for providing a soft feel.

16. A method of forming a visor family for automotive vehicles, comprising:

providing a first visor having a first side portion and a second side portion wherein;

i) the first visor includes a molded polymer perimeter portion surrounding an insert on the first side portion of the first visor, the insert being of different material than the perimeter portion; and ii) the second side portion of the first visor supports a first peripheral component;

providing a second visor of the visor family having a first side portion and a second side portion wherein;

i) the second visor includes a molded polymer perimeter portion surrounding an insert on the first side portion of the second visor;

ii) the first side portion of the second visor is substantially identical to the first side portion of the first visor; and iii) the second side portion of the second visor supports a second peripheral component different from the first peripheral component;

assembling the first visor to a first automotive vehicle of a first size and first style; and assembling the second visor to a second automotive vehicle of a second size and a second style different respectively from the first size and first styles;

wherein the first peripheral component is an insert and the second peripheral component is a vanity.

17. A method of forming a visor family as in claim 16 wherein the first side portion is at least partially attached to the second side portion via a snap-fit.

18. A method of forming a visor family as in claim 16 wherein the injection molded polymer includes polypropylene.

19. A method of forming a visor family as in claim 16 wherein the perimeter portion of the first side portion includes a gripping region, the gripping region including a relatively soft polymer different from the injection molded polymer for providing a soft feel.

20. A method of forming a visor family for automotive vehicles, comprising:

providing a first visor having a first side portion and a second side portion wherein;

i) the first visor includes a molded polymer perimeter portion surrounding an insert on the first side portion of the first visor, the insert being of different material than the perimeter portion; and iii) the second side portion of the first visor supports a first peripheral component;

providing a second visor of the visor family having a first side portion and a second side portion wherein;

i) the second visor includes a molded polymer perimeter portion surrounding an insert on the first side portion of the second visor;

ii) the first side portion of the second visor is substantially identical to the first side portion of the first visor; and iii) the second side portion of the second visor supports a second peripheral component different from the first peripheral component;

assembling the first visor to a first automotive vehicle of a first size and first style; and assembling the second visor to a second automotive vehicle of a second size and a second style different respectively from the first size and first style;

wherein the first peripheral component is an insert and the second peripheral component is a pocket.

21. A method of forming a visor family as in claim 20 wherein the first side portion is at least partially attached to the second side portion via a snap-fit.

22. A method of forming a visor family as in claim 20 wherein the injection molded polymer includes polypropylene.

23. A method of forming a visor family as in claim 20 wherein the perimeter portion of the first side portion includes a gripping region, the gripping region including a relatively soft polymer different from the injection molded polymer for providing a soft feel.

* * * * *